Sept. 1, 1970  D. F. ROHRER  3,526,385
O-RING WITH INTEGRAL STEM SEALING MEANS
AND BUTTERFLY VALVE USING SAME
Filed Feb. 19, 1968
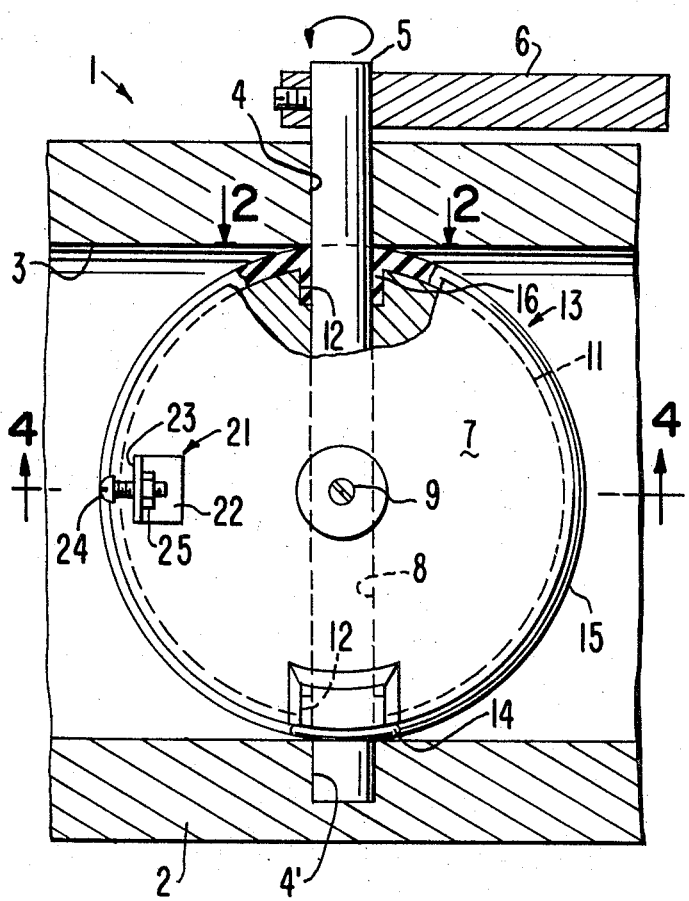
FIG. 1
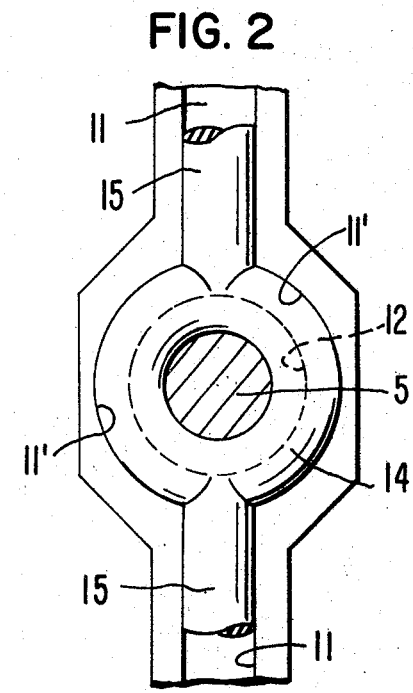
FIG. 2
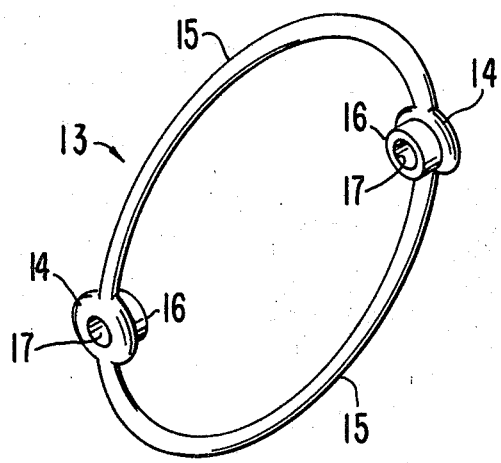
FIG. 3
FIG. 4
INVENTOR.
DANIEL F. ROHRER
BY
Leon F. Herbert
ATTORNEY

# United States Patent Office 3,526,385
Patented Sept. 1, 1970

3,526,385
O-RING WITH INTEGRAL STEM SEALING MEANS AND BUTTERFLY VALVE USING SAME
Daniel F. Rohrer, Hillsboro, Oreg., assignor to Varian Associates, Palo Alto, Calif., a corporation of California
Filed Feb. 19, 1968, Ser. No. 706,481
Int. Cl. F16k *1/226*
U.S. Cl. 251—306                                   5 Claims

ABSTRACT OF THE DISCLOSURE

A butterfly valve assembly is disclosed. The valve assembly includes a disk-shaped valve disposed within the cylindrical bore of a valve housing. The cylindrical bore defines the fluid passageway to be valved. The housing contains a smaller transverse bore intersecting the fluid passageway at right angles to accommodate a valve stem passable therethrough. The valve stem passes diametrically into and through the midplane of the valve disk. The disk is fixedly secured to the valve stem for rotation by means of the valve stem, which extends to the outside of the valve housing. The valve disk includes a peripheral groove for containing a resilient O-ring for sealing the valve disk to the walls of the fluid passageway. The peripheral groove in the valve disk and the O-ring both include diametrically opposed annular portions surrounding the valve stem. In addition, the peripheral groove is counter-bored around the valve stem to receive a radially directed sleeve portion of the O-ring which protrudes inwardly from the annular portion for sealing the valve stem to the valve disk. In addition, the diametrically opposed annular portions of the O-ring, which surround the valve stem, continuously seal the transverse bore in the valve housing to the valve disk. The resultant butterfly valve assembly is extremely simple and inexpensive to construct, since the one integral O-ring provides both the valve seal and the stem seal and the O-ring is carried upon the valve disk.

DESCRIPTION OF THE PRIOR ART

Heretofore, butterfly valves have been proposed wherein an O-type sealing ring was carried about the periphery of the valve disk in a butterfly valve assembly. Such a butterfly valve assembly is disclosed in U.S. Pat. 2,657,-896, issued Nov. 3, 1953. In this valve structure, the O-ring was diverted to one side around the valve stem to provide a continuous sealing ring for the valve disk. Separate O-rings were disposed in the transverse bore of the housing for sealing the valve stem to the housing. While such a valve assembly offers the advantages of a simple continuous sealing ring around the valve disk, the assembly includes the undesired complexity of additional O-rings for sealing the valve stem to the housing.

In the other prior art, the O-type sealing ring, for sealing the butterfly valve disk, is carried within an annular groove in the interior wall of the fluid passageway. The O-ring also includes a pair of diametrically opposed ring portions for receiving the valve stem therethrough for sealing the valve stem to the housing. Such a butterfly valve assembly and sealing ring is disclosed in U.S. Pats. 2,847,181 issued Aug. 12, 1958 and 3,095,177 issued June 25, 1963. While the latter type of butterfly valve assembly has the advantage of providing only one sealing ring for sealing both the valve stem and the valve, it is relatively expensive and complicated, to manufacture, due to the difficulty of machining the O-ring retaining groove in the interior wall of the fluid passageway. Furthermore, it is relatively difficult in such an arrangement to replace the O-ring compared with the relative ease of stretching the O-ring over the outer periphery of the valve disk. Furthermore, as the valve disk is rotated into the closed position, it produces an uneven scrubbing action on the stationary O-ring, tending to distort the O-ring and open the seal. Also as this movement is taking place the O-ring that is contained in the annular groove around the valve stem bore is required to seal two places that are rotating, one being the valve stem, the other that portion of the valve disk that is in contact with the diametrically opposed annular portions of the O-ring. As these are two rotating seals and one static seal at this point, the rotation of the valve disk and valve stem tend to rotate the diametrically annular portions of the O-ring in the direction of movement and distort the O-ring from its original configuration, thereby causing a leak.

Therefore, it is desirable to obtain an improved butterfly valve assembly wherein the O-ring is carried on the periphery of the valve disk and wherein the O-ring includes integral stem sealing means.

SUMMARY OF THE PRESENT INVENTION

The principal object of the present invention is the provision of an improved O-ring with integral stem sealing means and butterfly valves using same.

One feature of the present invention: In a butterfly valve assembly of an O-type sealing ring disposed in a groove extending around the periphery of the valve disk and wherein the sealing ring contains at least one annular ring portion disposed and circling the valve stem for sealing the valve disk to a transverse bore through which the valve stem passes through the valve housing to the valve disk.

Another feature of the present invention is the same as the preceding feature, wherein the valve disk includes a counter bore encircling the valve stem and wherein the O-ring includes a radially protruding sleeve which fits within the counter bore for sealing the valve stem to the valve disk.

Another feature of the present invention is the same as the preceding feature, wherein the valve stem passes diametrically through the valve disk.

Another feature of the present invention is the provision of an O-type sealing ring formed in one piece of resilient material with the ring having a pair of diametrically opposed smaller ring portions disposed with their axes of revolution in axial alignment with each other and with the axes falling on a diameter of the sealing ring, and wherein each of the smaller ring portions includes a radially directed sleeve portion projecting radially inwardly of the O-ring structure for sealing a stem axially passable through said sleeve portions along the diameter of the sealing ring.

Other features and advantages of the present invention will become apparent upon a perusal of the following specification taken in connection with the accompanying drawings, wherein:

BRIEF DESCRIPTION OF THE DRAWINGS

FIG. 1 is a longitudinal sectional view, partly broken away, of a butterfly valve assembly incorporating features of the present invention, FIG. 2 is an enlarged sectional view of a portion of the structure of FIG. 1 taken along line 2—2 in the direction of the arrows, FIG. 3 is a perspective view of an O-type sealing ring incorporating features of the present invention, and FIG. 4 is a reduced, schematic, longitudinal sectional view of a valve housing of the type shown in FIG. 1 and taken along line 4—4 in the direction of the arrows.

DESCRIPTION OF THE PREFERRED EMBODIMENTS

Referring now to FIG. 1, there is shown a butterfly valve 1 of the present invention. The valve 1 includes a valve housing structure 2, such as a length of tubular pipe, having a longitudinal bore 3 defining a fluid passageway which is to be valved. The housing 2 includes a smaller diameter bore 4 transversely intersecting the longitudinal bore 3 and passing diametrically across the tubular housing 2 through one side wall and into the diametrically opposed portion of the side wall to form first and second transverse intersecting bores 4 and 4'. A rotatable valve stem 5 is axially inserted through the transverse bore 4. One end of the valve stem 5 is retained within the side wall of the tubular housing 2 with the other end of the valve stem 5 passing out of the housing to receive a knob or handle 6 for turning the valve stem 5.

A valve disk 7 is centrally bored at 8 along a diameter of the disk to receive the valve stem 5 axially slidable therethrough. The diametric bore 8, which receives the valve stem 5, is disposed in the center plane of the disk 7 and a set screw 9 serves to clamp the valve disk 7 to the valve stem 5 for rotation of the valve disk 7.

The valve disk 7 includes a peripheral groove 11 extending completely around the entire periphery of the valve disk 7. In the regions of the valve disk 7 which surround the valve stem 5, the peripheral groove 11 is divided into two portions 11', which divide to pass on both sides of the valve stem 5, such that the groove 11' encircles the valve stem 5 (see FIG. 2). The regions of the valve disk 7, near its periphery where the valve stem 5 passes through the valve disk 7, are provided of increased thickness to accommodate the annular groove portions 11'. Likewise, the valve disk 7 is provided with a region of increased thickness to accommodate the set screw 9. The diametric bore 8 in the valve disk 7 is provided with a pair of counter bores 12 at its ends near the periphery of the valve disk 7.

An O-type resilient sealing ring 13, formed in one piece of material, is fitted within the peripheral groove 11 and the counter bores 12. The ring 13 is shown in FIG. 3 and includes two diametrically opposed annular portions 14 interconnected by two diametrically opposed arcuate sections 15. In addition, the ring 13 includes a pair of cylindrical sleeve portions 16, axially aligned with the central apertures 17 in the annular portions 14. The annular portions 14 and the sleeve portions 16 fit within the annular portions 11' of the peripheral groove and radially directed counter bore 12, respectively.

The sleeve portions 16 are compressed by the counter bore 12 against the valve stem 5 to form a seal between the disk 7 and the valve stem 5. In addition, the sleeve portions 16 serve to reinforce the annular portions 14 to prevent distortion of the annular portions 14 as the valve disk 7 is rotated into the closed position. The annular portions of the O-ring 13 are continuously compressed against the inside wall of the large bore 3 at the periphery of the intersecting transverse bore 4 to form a fluid tight seal between the valve disk 7 and the large bore 3 in a region which encircles the intersecting bore 4, such that the bore 4 is continuously sealed in a fluid tight manner to the valve disk 7.

Suitable O-ring materials include natural rubber, neoprene, Buna nitrile, fluorocarbon rubber and silicon rubber. Suitable O-ring materials are available from Parker Seal Company of Culver City, Calif.

The valve disk 7 (see FIGS. 1 and 4) also includes a positional stop structure 21, affixed thereto. The stop structure 21 includes a right angle bracket 22 fixedly secured to the valve disk 7 as by a screw, not shown. The outwardly protruding leg portion 23 of the bracket 22 includes a tapped hole to receive a screw 24. A locknut 25 is provided for locking the screw 24 in a desired point of adjustment. The screw 24 is adjusted such that when the lever 6 is moved in the direction out of the paper, as shown by the arrow, the valve disk 7 will rotate until the positioning screw 24 engages the inside wall of the bore 3, thereby stopping further rotation of the valve disk 7.

In a typical two inch butterfly valve 1 of the present invention, the inner diameter of the peripheral groove 11 was 1.740 inches, the diameter of the valve disk 7 was 1.960 inches and the width of the peripheral groove 11 was 0.136 inch, which was also the diameter of the cross section of the O-ring material. The O-ring 13 was compressed 0.005 inch on its diameter. This 0.005 inch compression was continuously obtained along the axis of the valve stem 5 and was obtained when the valve 7 was in the closed position. The valve stem 5 was 0.187 inch in diameter and the radial bores 17 in the O-ring 13 were 0.150 inch in diameter, thereby making the inside diameter of the sleeves 16 approximately 0.037 inch undersize for obtaining a compressive seal to the stem 5. The aforedescribed butterfly valve 1 is especially useful for valving the control of gases in a vacuum system and has proven to be very effective for completely valving off vacuum chambers and the like at pressures down to $1 \times 10^{-7}$ torr with leak rates less than $1 \times 10^{-11}$ cc. of helium per second. Butterfly valves 1 of the present invention are especially useful in sizes ranging from 0.5 to 4 inches in diameter.

What is claimed is:

1. In a butterfly valve assembly, a valve housing structure having a first bore therethrough to define a fluid passageway, means forming a valve disk structure pivotable within said first bore for valving the flow of fluid through said fluid passageway, said housing structure having a second bore therein of smaller cross-sectional dimension than said first bore passing through the wall of said housing and transversely intersecting said first bore, a valve stem passing through said second bore and engaging said disk substantially along a radius of said disk and substantially in a midplane of said disk, said valve disk structure having a peripheral groove formed in the marginal lip thereof and extending completely around the periphery of said disk, means forming a continuous resilient sealing ring disposed in said groove and encircling said valve disk for sealing said valve disk to the interior wall of said fluid passageway when the disk is pivoted to its closed position transversely of said fluid passageway, said sealing ring having a radially directed bore therethrough for passage of said valve stem with the annular lip of said bore in said sealing ring encircling the aperture formed in the wall of said first bore at the intersection of said first and second bore to thereby form a sealing ring in continuous sealing engagement between said disk and the interior wall of said fluid passageway for continuously sealing the second transverse bore in said housing to said valve disk, said sealing ring including an inwardly radially directed sleeve portion forming an inward extension of the marginal edge of said radial bore in said sealing ring, and said sleeve portion bearing in sealing engagement with said valve stem passing therethrough to provide fluid sealing of said valve stem to said valve disk.

2. The apparatus of claim 1, wherein said housing includes a third bore transversely interconnecting with said fluid passageway and axially aligned with said second bore, said valve stem extending through said valve disk and into said third bore in said housing, said sealing ring having a second transverse radial bore therein in axial alignment with said first radial bore to receive said valve stem therethrough, the annular lip portion of said second bore in said sealing ring disposed encircling said third bore in said housing and forming a sealing ring in continuous sealing engagement between said disk and the wall of said fluid passageway for continuously sealing the third transverse bore in said housing to said valve disk.

3. The apparatus of claim 1, wherein said sealing ring engages said valve stem in sealing relation at the inner marginal edge of said radial bore in said sealing ring for fluid sealing said valve stem to said valve disk.

4. The apparatus of claim 1, wherein said valve disk includes a radial bore and a counter bore concentric of said radial bore to receive said valve stem therethrough, said counter bore being disposed near the periphery of said valve disk, the inside wall of said radial counter bore serving to radially press said sleeve portion of said sealing ring into sealing engagement with said valve stem.

5. In a sealing ring of generally ring-shaped configuration formed in one piece of resilient material, said ring having a pair of diametrically opposed annular portions formed in said larger generally ring-shaped structure, said annular portions being formed with their axes of revolution in axial alignment with each other and coinciding with a diameter of said sealing ring, the improvement wherein said diametrically opposed annular ring portions each include a radially directed sleeve portion projecting radially inwardly of the generally ring-shaped structure for sealing to a shaft axially passable through said sleeve portions along a diameter of the composite sealing ring.

References Cited
UNITED STATES PATENTS

| | | | |
|---|---|---|---|
| 2,853,267 | 9/1958 | Herren et al. | 251—308 XR |
| 2,385,510 | 9/1945 | Harwood | 251—306 |
| 3,024,802 | 3/1962 | Stillwagon | 137—454.2 XR |
| 3,072,139 | 1/1963 | Mosites | 137—454.2 XR |
| 3,346,005 | 10/1967 | Hanssen | 137—375 |

HENRY T. KLINKSIEK, Primary Examiner

U.S. Cl. X.R.

277—237